(No Model.)
C. D. ROGERS.
WOOD SCREW.
No. 367,011. Patented July 19, 1887.
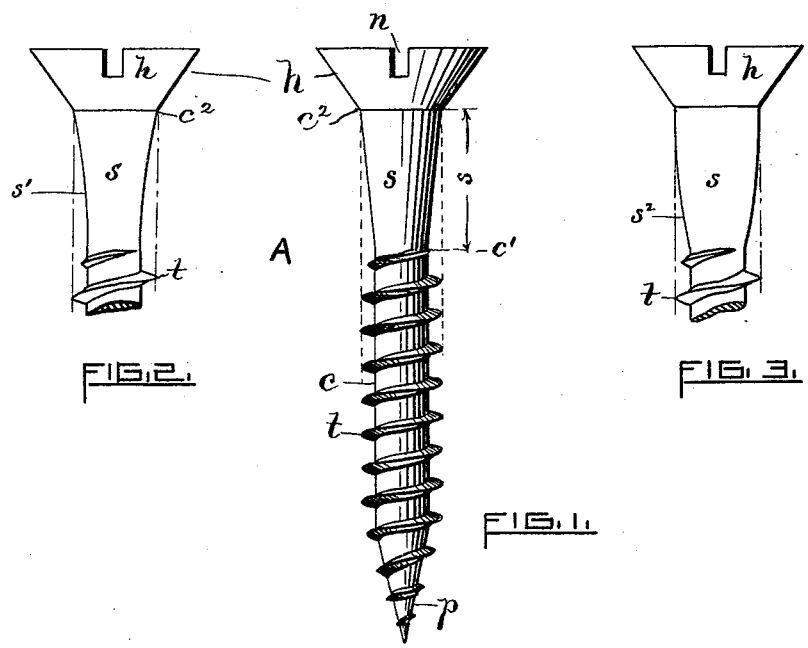
WITNESSES.
Charles Hannigan
Joseph A. C. Sanford
INVENTOR.
Charles D. Rogers.
by Remington & Henthorn
Att'y's.

United States Patent Office.

CHARLES D. ROGERS, OF PROVIDENCE, RHODE ISLAND, ASSIGNOR TO THE AMERICAN SCREW COMPANY, OF SAME PLACE.

WOOD-SCREW.

SPECIFICATION forming part of Letters Patent No. 367,011, dated July 19, 1887.

Application filed November 26, 1886. Serial No. 219,857. (No model.)

*To all whom it may concern:*

Be it known that I, CHARLES D. ROGERS, a citizen of the United States, residing at Providence, in the county of Providence and State of Rhode Island, have invented certain new and useful Improvements in Wood-Screws; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in wood-screws, so called, and consists, essentially, in the novel construction of the shank or stem contiguous to the head.

The object of my present invention is to produce a stronger wood-screw than heretofore. To this end the diameter of the core of the screw, at the commencement of the screw-thread, is made to gradually increase up to its intersection with the head, thereby forming a conical (or substantially so) shank or plain portion, all as will be more fully hereinafter set forth and claimed.

In the accompanying drawings, Figure 1 represents a perspective view of my improved wood-screw, enlarged, and Figs. 2 and 3 represent similar views of the plain shank portion and head, having a slightly-modified outline.

The following is a more detailed description of the invention:

A indicates the improved wood-screw as a whole, the convolutions of the screw-thread $t$, the core $c$, and the screw-threaded point $p$ being substantially as usual, said screw-thread being produced by the "rolling" process, involving the use of dies, a description of mechanism for the purpose not being deemed essential to this specification.

The novelty in the wood-screw illustrated herewith consists in the peculiar form of the unthreaded shank portion $s$, the same commencing at the screw-thread $t$ at the point $c'$, and extends rearwardly in an increasing diameter up to the point of its intersection, $c^2$, with the head $h$, said diameter at $c^2$ being practically the same as the outer diameter of the screw-thread, as indicated by the dotted lines.

In Fig. 2 the shank $s$ is represented as being slightly concave in the direction of its length, as at $s'$, the diameter thereof at its junction with the head $h$ being enlarged and corresponding substantially with the outer diameter of the screw-thread $t$, as just described with reference to Fig. 1. In Fig. 3 the shank $s$ is shown as being slightly convex in the direction of its length, as at $s^2$.

The head $h$ may be of any desired form, as usual, and have a nick, $n$, or its equivalent therein, by means of which the screw is adapted to be axially turned.

The advantage possessed by a screw having my improved shank $s$ is, that the screw is much stiffer and stronger than one wherein the shank is of uniform diameter throughout at the core.

Having thus described my invention, what I claim as new, and desire to secure by Letters Patent of the United States, is—

1. The wood-screw hereinbefore described, having the unthreaded shank portion thereof which connects the head and the screw-threaded portion extending rearwardly from the core of the screw in a divergent direction, substantially as shown and set forth.

2. The improved wood-screw hereinbefore described, the same consisting of a screw-threaded portion terminating in a sharpened point, a head adapted to receive a screw-driver, and a tapering or cone-shaped shank connecting said head and screw-threaded portion, substantially as shown and set forth.

3. The improved wood-screw having the diameter of the shank at the intersection with the head substantially the same as the outer diameter of the screw-thread and tapering therefrom in a decreasing ratio to the root or core of the thread, for the purpose hereinbefore set forth.

In testimony whereof I have affixed my signature in presence of two witnesses.

CHARLES D. ROGERS.

Witnesses:
WM. R. DUTEMPLE,
GEO. H. REMINGTON.